United States Patent [19]

Imai et al.

[11] Patent Number: 4,622,281

[45] **Date of Patent: * Nov. 11, 1986**

[54] MAGNETIC COLOR TONER CONTAINING GAMMA FERRIC OXIDE PARTICLES

[75] Inventors: Eiichi Imai, Narashino; Hiroyuki Kobayashi; Yasuo Mitsuhashi, both of Yokohama, all of Japan

[73] Assignee: Canon Kabushiki Kaisha, Tokyo, Japan

[ * ] Notice: The portion of the term of this patent subsequent to May 15, 2001 has been disclaimed.

[21] Appl. No.: 815,140

[22] Filed: Jan. 3, 1986

Related U.S. Application Data

[63] Continuation of Ser. No. 488,666, Apr. 26, 1983, abandoned.

[30] Foreign Application Priority Data

Apr. 28, 1982 [JP] Japan .................................. 57-72358
Apr. 28, 1982 [JP] Japan .................................. 57-72359

[51] Int. Cl.[4] ........................ C01G 49/06; G03C 5/46

[52] U.S. Cl. .................................... 430/107; 106/304; 252/62.51; 252/62.56; 252/62.54; 423/633; 423/634; 430/106.6

[58] Field of Search ............................ 430/106.6, 107; 106/304; 423/633, 634; 252/62.51 R, 62.56, 62.54

[56] References Cited

U.S. PATENT DOCUMENTS

| | | | |
|---|---|---|---|
| 3,647,696 | 3/1972 | Olson | 430/109 |
| 4,121,931 | 10/1978 | Nelson | 427/18 |
| 4,199,614 | 4/1980 | Ziolo | 430/111 |
| 4,256,818 | 3/1981 | Blossey et al. | 430/106.6 |
| 4,265,992 | 5/1981 | Kouchi et al. | 430/106.6 |
| 4,282,302 | 8/1981 | Makino | 430/107 |
| 4,293,627 | 10/1981 | Murphy et al. | 252/62.54 X |
| 4,448,870 | 5/1984 | Imai et al. | 430/107 |

FOREIGN PATENT DOCUMENTS

| | | |
|---|---|---|
| 1203808 | 3/1973 | Fed. Rep. of Germany . |
| 2704361 | 7/1979 | Fed. Rep. of Germany . |

*Primary Examiner*—John E. Kittle
*Assistant Examiner*—Mukund J. Shah
*Attorney, Agent, or Firm*—Fitzpatrick, Cella, Harper & Scinto

[57] ABSTRACT

A magnetic color toner stable to heat and light which does not fade or discolor for a long period of time is prepared by incorporating $\gamma$-$Fe_2O_3$ particles as a magnetic component in a toner.

11 Claims, 1 Drawing Figure

MAGNETIC COLOR TONER CONTAINING GAMMA FERRIC OXIDE PARTICLES

This application is a continuation of application Ser. No. 488,666 filed Apr. 26, 1983, abandoned.

BACKGROUND OF THE INVENTION

1. Field of the Invention

The present invention relates to a magnetic toner for use in electrophotography, electrostatic printing, magnetic recording, and the like, and particularly to a magnetic color toner for these purposes.

2. Description of the Prior Art

Electrophotography is an image forming process in which; an electrostatic latent images are formed by utilizing a photoconductive material such as cadmium sulfide, polyvinylcarbazole, selenium, or zinc oxide, for instance, by affording uniform electric charge onto a photoconductive layer and subjecting the layer to image exposure; the electrostatic images thus formed are developed with a reverse-polarity charged toner; and if necessary, the toner images are transferred and fixed onto a transfer recording medium.

Electronic printing, as disclosed in German Pat. No. 1203808 and in other literature, is a printing process in which electrically charged toner particles are led onto a recording medium by utilizing electric field and are fixed on the medium.

Electrostatic recording is a process in which electrostatic latent images are formed from information signals on a dielectric layer and developed with electrically charged toner particles, and the resulting toner images are fixed.

Magnetic recording is a process in which magnetic latent images are formed similarly on a recording medium and developed with magnetic material-containing toner particles, and the resulting toner images are transferred and fixed onto a transfer recording medium.

Various techniques are known to develop these electric or magnetic latent images with toners. The techniques are roughly classified into the dry development process and the wet development process. The former is further divided into a process employing a two-component developer composed of toner particles and carrier particles and a process employing a one-component developer which does not contain carrier particles.

Prevailing techniques belonging to the process employing a two-component developer are the magnetic brush process and the cascade process, which are different from each other in the type of carrier for carrying a toner, the former employing a powder iron carrier and the letter employing a bead carrier.

There have been proposed a variety of processes which employ a one-component developer composed of a toner alone. Of these processes, many excellent processes employing a magnetic toner are in practical use, including the Magne-Dry process, which employs an electrically conductive toner; the process of DAS No. 2,704,361, which utilizes the dielectric polarization of toner particles; the process of U.S. Pat. No. 4,121,931, in which electric charge is transferred by agitation of a toner; and the process of U.S. Ser. Nos. 938,101 and 58,434 offered by the present applicant, in which toner particles are driven to fly toward latent images to develop them.

On the other hand, the purpose of recording or copying has been diversified recently and a color copying machine compact and inexpensive is looked for which is capable of forming images of different colors as required. In the one-component magnetic toners mentioned above, magnetite or ferrite has been used conventionally as the magnetic component. Its colors, being black or dark brown, is a great obstruction to the preparation of a so-called color toner, though effective for a black toner. In order to surmount this obstruction, whitening or coloring of black magnetic materials has been proposed. However, these proposed methods are not only insufficient for masking said magnetic materials and for forming an image of intended color, but also unsatisfactory in various practical characteristics of the toner for performing electrophotography, including initial state properties such as developing ability, transferability, fixability, and cleaning ability and long-term properties such as durability, environmental stability, and preservability.

SUMMARY OF THE INVENTION

An object of this invention is to provide a magnetic toner red, orange, yellow or sepia which overcomes the above noted drawbacks.

Another object of this invention is to provide a magnetic color toner excellent in developing ability, transferability, fixability, and cleaning ability.

Another object of this invention is to provide a magnetic color toner excellent in durability for repeated developments and in stability to changes in environmental conditions.

Another object of this invention is to provide a magnetic color toner which is stable to heat and light and does not fade or discolor for a long period of time.

These objects can be achieved with the magnetic color toner of this invention which is characterized by comprising magnetic material $\gamma$-$Fe_2O_3$ particles and a binder.

The first embodiment of this invention is a magnetic color toner which contains $\alpha$-$Fe_2O_3$ particles and magnetic $\gamma$-$Fe_2O_3$ particles as main components of the magnetic material and the colorant. Preferably, the first embodiment is a color magnetic toner comprising at least a magnetic material, colorant, and binder, wherein said magnetic material is contained in an amount of 20–100 parts, particularly 40–80 parts, by weight to 100 parts by weight of said binder, $\gamma$-$Fe_2O_3$ particles are contained as a magnetic material in an amount of at least 60% by weight of the whole magnetic material, and $\alpha$-$Fe_2O_3$ particles are contained in an amount of 1–50%, particularly 3–30% by weight based on said total magnetic materials.

The second embodiment of this invention is a magnetic color toner which contains magnetic $\gamma$-$Fe_2O_3$ particles, as a main component of the magnetic material and colorant thereof, and a colorant soluble in the binder. Preferably, the second embodiment is a magnetic color toner comprising at least a magnetic material, colorant, and binder, wherein said magnetic material is contained in an amount of 20–100 parts, particularly 40–80 parts, by weight to 100 parts of said binder, $\gamma$-$Fe_2O_3$ particles are contained as a magnetic material in an amount of at least 60% by weight of the whole magnetic material, and the colorant soluble in the binder is contained in an amount of 0.1–30 parts, particularly 0.5–20 parts by weight to 100 parts by weight of the binder.

DETAILED DESCRIPTION OF PREFERRED EMBODIMENTS OF THE INVENTION

Figure 1:
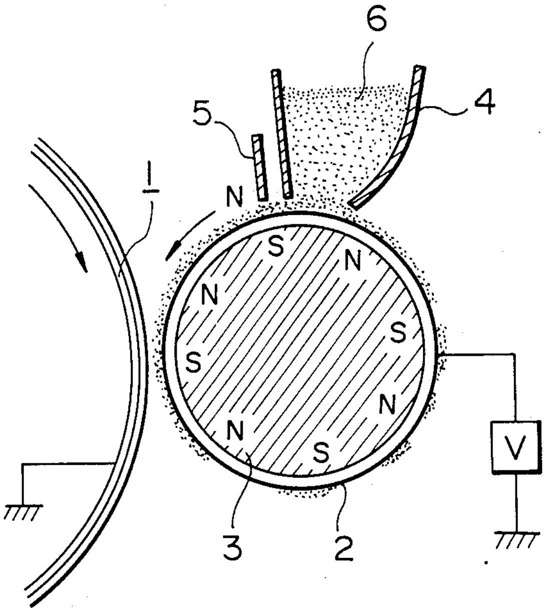
FIG. 1 is a cross-sectional view of an arrangement for carrying out a development process to which the toner of this invention is adaptable.

Both $\gamma$-$Fe_2O_3$ particles and $\alpha$-$Fe_2O_3$ particles can be prepared by (1) neutralizing iron sulfate or iron chloride solution with alkali, oxidizing the resultant with heat to form once $Fe_3O_4$, and further oxidizing the $Fe_3O_4$, or (2) coprecipitating $Fe_3O_4$ with alkali from a ferrous salt-ferric salt mixed solution and oxidizing the $Fe_3O_4$. In this case, $\gamma$-$Fe_2O_3$ particles or $\alpha$-$Fe_2O_3$ particles can be produced at will be varying operational conditions for the oxidation of $Fe_3O_4$. Usually, the oxidation at approximately 200°-300° C. gives $\gamma$-$Fe_2O_3$ particles and at approximately 400°-700° C. gives $\alpha$-$Fe_2O_3$ particles.

$\gamma$-$Fe_2O_3$ particle, having a red-brown hue, is very favorable as a magnetic component of a red or sepia magnetic toner, permitting minimizing the amount of colorant jointly used as required. This magnetic material may be surface-treated, for instance, with a coupling agent or the like.

As the $\alpha$-$Fe_2O_3$ particle content increases, the color of the toner becomes better, but large amounts of $\alpha$-$Fe_2O_3$ particle adversely affect magnetic properties of the toner since $\alpha$-$Fe_2O_3$ has no ferromagnetism. Thus, suitable content of $\alpha$-$Fe_2O_3$ particles is in the range from 1-50%, particularly 3-30% by weight based on the magnetic material.

The $\gamma$-$Fe_2O_3$ particle-containing toner of this invention is stable to light and heat so that color images formed with this toner do not fade or discolor for a long period of time. In addition, the toner has a higher electric resistance as compared with toners composed mainly of $Fe_3O_4$ particles. Thus, when used in particular as a magnetic color insulating toner, this toner exhibits excellent triboelectric chargeability and triboelectricity-retaining ability and improved developing ability, transferability, and durability, giving good quality images with high optical density.

The magnetic toner of this invention is also effective in preventing a so-called image running which may take place on a latent-image bearing surface. The image running is considered to result on account of some substance like $O_3$ or $NO_x$ deposited on the image bearing surface by corona discharge or on account of the deterioration of the surface itself by corona discharge. The $Fe_2O_3$ particles in the toner of this invention possibly clean such a contaminant or deteriorated portions by polishing the surface, thereby maintaining good image quality during repeated service operations.

Moreover, the toner of this invention exhibits good characteristics resisting changes in environmental conditions. For instance, when toner particles are brought into a low free flow state by high humidity environmental conditions or other causes, agglomeration of toner particles will occur if the toner particles are relatively uneven in composition. This agglomerate cannot be thoroughly broken up with magnetic force, thus resulting in the deterioration of image quality and the reduction of image density. This phenomenon is reasonably inhibited in the case of the toner of this invention. The cause of this antiagglomeration effect is not clear, but seems to be that the colorant content can be minimized by using $\gamma$-$Fe_2O_3$ particles and the colorant is therefore completely dissolved in the binder, thereby improving the composition uniformity of individual toner particles. When the toner contains $\gamma$-$Fe_2O_3$ particles and $\alpha$-$Fe_2O_3$ particles, another possible cause of the anti-agglomeration effect is that $\gamma$-$Fe_2O_3$ particles and $\alpha$-$Fe_2O_3$ particles can be dispersed uniformly in the binder since they are much analogous to each other in powder properties, particularly in apparent density, oil absorption, specific surface area, pH, and the like.

In the toner of this invention, it is possible to incorporate, jointly with $\gamma$-$Fe_2O_3$ particles, any other magnetic material selected from $Fe_3O_4$ of relatively large particle sizes, various metal ferrites, and iron powder, wherein the content of these magnetic materials is desired up to 40% by weight of the whole magnetic material.

Binders acceptable in the toner of this invention include homopolymers and copolymers of styrene and its substitution products, such as polystyrene, poly(p-chlorostyrene), polyvinyltoluene, styrene-p-chlorostyrene copolymer, styrene-vinyltoluene copolymer, and the like; styrene-acrylic acid ester copolymers such as styrene-methyl acrylate, styrene-ethyl acrylate, and styrene-n-butyl acrylate copolymers, and the like; styrene-methacrylic acid ester copolymers such as styrene-methyl methacrylate, styrene-ethyl methacrylate, and styrene-n-butyl methacrylate copolymers, and the like; multipolymers of styrene, acrylic acid esters, and methacrylic acid esters; copolymers of styrene and other ethylenic unsaturated monomers, such as styrene-acrylonitrile, styrene-vinyl methyl ether, styrene-butadiene, styrene-vinyl methyl ketone, styrene-acrylonitrile-indene, and styrene-maleic acid ester copolymers, and the like; and other resins such as poly(-methyl methacrylate), poly(butyl methacrylate), poly(-vinyl acetate), polyesters, polyamides, epoxy resins, poly(vinyl butyral), poly(acrylic acid), phenolic resins, aliphatic or alicyclic hydrocarbon resins, petroleum resin, chlorinated paraffin, etc. These binders may be used alone or in combination.

Binders for the toner used in the pressure fixing system include low molecular weight polyethylene, low molecular weight polypropylene, ethylene-vinyl acetate copolymer, ethylene-acrylic acid ester copolymers, higher fatty acids, polyamides, polyesters, etc. These binders can also be used alone or in combination.

In the toner of this invention, various colorants having a desired hue from red to brown can be incorporated, if necessary. Particularly suitable colorants soluble in binders are oil-soluble dyes belonging to the solvent dye group categorized in "Color Index", some of disperse dyes belonging to the disperse dye group categorized therein, and some of vat dyes belonging to the vat dye group categorized therein. These groups of dyes are insoluble in water and present color in the form of a substance dissolved in a plastic, oil, organic solvent, or the like, thus being basically different in the mode of coloration from inorganic or organic pigments that present color in the form of finely dispersed crystals. The abovementioned suitable colorants, when classified on the basis of chemical structure, are dyes of monoazo type, disazo type, anthraquinone type, triarylmethane type, ketone type, xanthene type, methine type, and their metallized type.

As the colorant content increases, the color of the toner becomes better, but magnetic properties of the toner becomes worse since these colorants have no ferromagnetism. Accordingly, the colorant content ranges desirably from about 0.1 to about 30%, preferably from about 0.5 to about 20%, by weight.

Some additives can be incorporated, if necessary, in the toner of this invention. Such additives include, for example, lubricants such as Teflon and zinc stearate, fixing aids such as low molecular weight polyethylene, flow improvers or anti-caking agents such as colloidal silica, and metal oxides such as tin oxide as conductivity donors.

The toner of this invention can be produced, for instance, by the following processes:

(1) Necessary components are thoroughly kneaded with heating by means of a heat roll mill, kneader, extruder, or the like and subjected to mechanical grinding and classification.

(2) Materials including a magnetic powder are dispersed in a binder solution, and the dispersion is spray dried.

(3) Prescribed materials are mixed with a monomer intended to constitute the binder resin and the resulting suspension is subjected to polymerization.

Developments of latent images by use of the toner of this invention can be accomplished by known processes, including the process of U.S. Pat. No. 3,909,258 wherein a conductive magnetic toner is used, the process of Japanese Patent Kokai Nos. 421,141/1979 and 18,650/1980 wherein an insulating magnetic toner is used, and the so-called micro-toning development process of Japanese Patent Kokai Nos. 83,630/1978 and 24,632/1979 wherein a developer comprising a magnetic toner and a non-magnetic toner is used. Among these processes, the second process employing an insulating magnetic toner is particularly favorable. According to this process, an electrostatic-image bearing member and a member for carrying a developer are opposed with a definite clearance being kept between them, the developer is applied onto the surface of the latter member to a thickness less than said clearance, and the developer is transferred onto the surface of said electrostatic-image bearing member to develop the images.

This invention will be illustrated in more detail by the following examples: All parts and percentages in the following formulations are by weight.

EXAMPLE 1

A mixture of the following composition was kneaded by means of a roll mill at 150° C. After cooling, the resulting mass was coarsely crushed with a speed mill and then finely pulverized with a jet mill. The powder was classified with an air classifier, giving a sepia magnetic toner of particle sizes 5–20μ.

| Composition: | |
|---|---|
| (1) Styrene-butadiene-dimethylaminoethyl methacrylate copolymer (60:26:4) | 80 parts |
| (2) Styrene-butyl acrylate copolymer (60:40) | 20 parts |
| (3) $\gamma$-$Fe_2O_3$ particle | 60 parts |
| (4) $\alpha$-$Fe_2O_3$ particle | 6 parts |

An image-forming test of this toner was conducted by using an apparatus as shown in FIG. 1 in the following manner: Negative-electrostatic latent images were formed on a well-known zinc oxide photosensitive layer laid on a drum 1. A sleeve 2 provided with magnets 3 therein was placed close to the photosensitive drum 1 as shown in FIG. 1 so as to keep the distance from the drum 1 at 0.25 mm (the drum and the sleeve rotate in opposite directions at the same peripheral speed, but the magnets do not rotate; surface magnetic flux density : 700 gauss; distance between a doctor knife 5 and the sleeve surface: 0.2 mm). The latent image was developed with the sepia magnetic toner by applying a 1.2-KHz A.C. voltage of 1.2 KV and a D.C. bias of −150 V to the sleeve 2. Then, the resulting toner images were transferred on the transfer paper while exposing the back side of the transfer paper to a corona of D.C. −7 KV. The transferred images were fixed by using a commercial plain-paper copying machine (tradename: NP-200J, mfd. by Canon Inc.). The toner remaining on the photosensitive drum 1 after transferring was cleaned with a magnetic brush cleaner.

The resulting copy exhibited clear, fog-free, firmly fixed images having a subdued sepia color. The images indicated no fading or discoloration during a long-term Fade-O-Meter exposure test.

EXAMPLE 2

A sepia magnetic toner was prepared from a mixture of the following composition in the same manner as in Example 1:

| Composition: | |
|---|---|
| (1) Styrene-butadiene copolymer (70:30) | 100 Parts |
| (2) Chromium complex salt of 3,5-di-t-butyl salicylate | 2 parts |
| (3) $\gamma$-$Fe_2O_3$ particle | 70 parts |
| (4) $\alpha$-$Fe_2O_3$ particle | 2.5 parts |
| (5) Polyethylene | 3 parts |

An image-forming test of the toner was conducted by using a commercial copying machine (the same that was used for fixing in Example 1), giving sepia color images of high quality having a sufficient density for practical use and also distinct letters. Further, a test of reproducing 10,000 copies with the toner was conducted to examine its durability. As the result, no particular defect was found in image quality throughout the test period including the time for toner supplement.

EXAMPLE 3

A durability test of continuous reproduction of 5,000 copies was made on the toner of Example 1 using a copying machine provided with an organic photosensitive member under the high temperature and humidity conditions of 30° C. and 90% R.H. The results indicated no substantial reduction in image density or deterioration of image quality so-called image running.

EXAMPLE 4

A red magnetic toner of the following composition was prepared and tested in the same manner as in Example 1. The resulting images were similarly good in color, image quality, etc.

| Composition: | |
|---|---|
| (1) Styrene-butadiene-dimethylaminoethyl methacrylate copolymer (60:26:4) | 80 parts |
| (2) Styrene-butyl acrylate copolymer (60:40) | 20 parts |
| (3) $\gamma$-$Fe_2O_3$ particle | 40 parts |
| (4) $Fe_3O_4$ of particle sizes about 1–2μ | 20 parts |
| (5) $\alpha$-$Fe_2O_3$ particle | 18 parts |
| (6) Red rhodamine dye | 2 parts |

EXAMPLE 5

A sepia magnetic toner of the following composition was prepared and tested in the same manner as in Example 1. The resulting images were similarly good in color, image quality, etc.

| Composition: | |
|---|---|
| (1) Styrene-butadiene-dimethylaminoethyl methacrylate copolymer (60:26:4) | 100 parts |
| (2) $\gamma$-$Fe_2O_3$ particle | 25 parts |
| (3) $Fe_3O_4$ of particle sizes about 1-2$\mu$ | 15 parts |
| (4) $\alpha$-$Fe_2O_3$ particle | 4 parts |

EXAMPLE 6

A yellow magnetic toner of the following composition was prepared and tested in the same manner as in Example 1. The resulting images were similarly clear, fog-free, firmly fixed and good in color, image quality, light fastness, etc.

| Composition: | |
|---|---|
| (1) Styrene-butadiene-dimethylaminoethyl methacrylate copolymer (60:26:4) | 80 parts |
| (2) Styrene-butyl acrylate copolymer (60:40) | 20 parts |
| (3) $\gamma$-$Fe_2O_3$ particle | 60 parts |
| (4) Yellow monoazo dye categorized as an oil-soluble dye in "Color Index" | 6 parts |

EXAMPLE 7

A magnetic toner of the following composition was prepared in the same manner as in Example 1.

| Composition: | |
|---|---|
| (1) Styrene-butadiene copolymer (70:30) | 100 parts |
| (2) Chromium complex salt of 3,5-di-t-butyl salicylate | 2 parts |
| (3) 65-$Fe_2O_3$ particle | 80 parts |
| (4) Orange anthraquinone dye categorized as an oil-soluble dye in "Color Index" | 1 part |
| (5) Polyethylene | 3 parts |

An image-forming test of the toner was conducted by using a commercial copying machine (the same that was used for fixing in Example 1), giving organe color images of high quality having a sufficient density for practical use and also distinct letters. Further, a test of reproducing 10,000 copies was conducted to examine the durability of the toner. As the result, no particular defect was found in image quality throughout the test period including the time for toner supplement.

EXAMPLE 8

A durability test of continuous reproduction of 5,000 copies was made on the toner of Example 6 using a copying machine provided with an organic photosensitive member under the high temperature and humidity conditions of 30° C. and 90% R.H. The results indicated no substantial reduction in image density or deterioration of image quality so-called image running.

EXAMPLE 9

A red magnetic toner of the following composition was prepared and tested in the same manner as in Example 1. The resulting images were similarly good in color, image quality, etc.

| Composition: | |
|---|---|
| (1) Styrene-butadiene-dimethylaminoethyl methacrylate copolymer (60:26:4) | 80 parts |
| (2) Styrene-butyl acrylate copolymer (60:40) | 20 parts |
| (3) $\gamma$-$Fe_2O_3$ particle | 40 parts |
| (4) $Fe_3O_4$ of particle sizes about 1-2$\mu$ | 20 parts |
| (5) Red anthraquinone dye categorized as an oil-soluble dye in "Color Index" | 15 parts |

EXAMPLE 10

A yellow magnetic toner of the following composition was prepared and tested in the same manner as in Example 1. The resulting images were similarly good in color image quality, etc.

| Composition: | |
|---|---|
| (1) Styrene-butadiene-dimethylaminoethyl methacrylate copolymer (60:26:4) | 100 parts |
| (2) $\gamma$-$Fe_2O_3$ particle | 25 parts |
| (3) $Fe_3O_4$ of particle sizes about 1-2$\mu$ | 15 parts |
| (4) Yellow methine dye categorized as a disperse dye in "Color Index" | 10 parts |

What we claim is:

1. A magnetic color toner providing a hue from red, orange, or yellow to sepia, comprising gamma-$Fe_2O_3$ particles and a binder resin, wherein said toner is an insulating toner having enhanced triboelectric chargeability and enhanced transferrability.

2. The magnetic color toner of claim 1, which comprises 20–100 parts by weight of gamma-$Fe_2O_3$ and 100 parts by weight of the binder resin.

3. The magnetic color toner of claim 1, which further contains a colorant soluble in the binder resin.

4. A magnetic color toner, comprising alpha-$Fe_2O_3$ particles, magnetic gamma-$Fe_2O_3$ particles as a main component of a magnetic material, and a binder resin in which 20–100 parts by weight of the magnetic material are contained in 100 parts by weight of the binder resin, wherein said toner is an insulating toner having enhanced triboelectric chargeability and enhanced transferrability.

5. The magnetic color toner of claim 4, wherein gamma-$Fe_2O_3$ particles are contained in an amount of at least 60% by weight to the magnetic material.

6. The magnetic color toner of claim 4, wherein alpha-$Fe_2O_3$ is contained in an amount of 1–50% by weight based on the magnetic material.

7. The magnetic color toner of claim 4, which further contains a colorant soluble in the binder resin.

8. A process for forming color images comprising:

(a) developing electrostatic latent images on a latent image-bearing member by a magnetic color insulating toner providing a hue from red, orange, or yellow to sepia comprising magnetic gamma-$Fe_2O_3$ particles as a main component of a magnetic material, a binder resin, and a colorant soluble in the binder resin;

(b) transferring toner images of the latent images onto a transfer recording medium; and (c) cleaning the latent image-bearing member.

9. The process of claim 8, wherein the toner comprises 20–100 parts by weight of the magnetic material and 100 parts by weight of the binder resin.

10. The process of claim 8, wherein magnetic gamma-$Fe_2O_3$ particles are contained in an amount of at least 60% by weight based on the magnetic material.

11. The process of claim 8, wherein the latent image-bearing member is an organic photoconductive photosensitive member.

* * * * *